US010515270B2

(12) United States Patent
Mese et al.

(10) Patent No.: US 10,515,270 B2
(45) Date of Patent: Dec. 24, 2019

(54) SYSTEMS AND METHODS TO ENABLE AND DISABLE SCROLLING USING CAMERA INPUT

(71) Applicant: Lenovo (Singapore) Pte. Ltd., New Tech Park (SG)

(72) Inventors: John Carl Mese, Cary, NC (US); Russell Speight VanBlon, Raleigh, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/647,454

(22) Filed: Jul. 12, 2017

(65) Prior Publication Data
US 2019/0019028 A1    Jan. 17, 2019

(51) Int. Cl.
| | | |
|---|---|---|
| *G06F 3/048* | (2013.01) | |
| *G06F 3/01* | (2006.01) | |
| *G06K 9/00* | (2006.01) | |
| *G06F 3/03* | (2006.01) | |

(52) U.S. Cl.
CPC ......... *G06K 9/00624* (2013.01); *G06F 3/017* (2013.01); *G06F 3/0304* (2013.01); *G06F 3/048* (2013.01); *G06K 9/00248* (2013.01)

(58) Field of Classification Search
CPC .................................................... G06F 3/013
See application file for complete search history.

(56) References Cited

U.S. PATENT DOCUMENTS

| | | | | |
|---|---|---|---|---|
| 8,957,847 B1* | 2/2015 | Karakotsios | ............ | G06F 3/013 345/156 |
| 2007/0078552 A1* | 4/2007 | Rosenberg | ............ | G06F 1/1626 700/94 |
| 2013/0054622 A1* | 2/2013 | Karmarkar | ........ | G06F 17/30032 707/749 |
| 2013/0201305 A1* | 8/2013 | Sibecas | ............ | H04N 21/42201 348/54 |
| 2014/0204029 A1* | 7/2014 | Lopez | ..................... | G06F 3/013 345/163 |
| 2014/0268054 A1* | 9/2014 | Olsson | ............... | G06K 9/00604 351/209 |
| 2015/0153889 A1* | 6/2015 | VanBlon | ............... | G06F 3/0416 345/173 |
| 2016/0116980 A1* | 4/2016 | George-Svahn | ........ | G06F 3/013 345/168 |

(Continued)

*Primary Examiner* — Ryan McCulley
(74) *Attorney, Agent, or Firm* — John L. Rogitz; John M. Rogitz

(57) ABSTRACT

In one aspect, a device includes at least one processor, a camera, at least one sensor, a display, and storage. The storage bears instructions executable by the at least one processor to receive input from the at least one sensor and determine, based on the input, whether a user is making physical contact with the device. Based on a determination that the user is not making physical contact with the device, the instructions are executable by the at least one processor to execute scrolling of content based on input from the camera, with the content presented on the display. Based on a determination that the user is making physical contact with the device, the instructions are executable by the at least one processor to decline to execute scrolling of content based on input from the camera.

20 Claims, 6 Drawing Sheets

(56) References Cited

U.S. PATENT DOCUMENTS

| | | | |
|---|---|---|---|
| 2016/0224308 A1* | 8/2016 | Pierce | G06F 3/165 |
| 2016/0225012 A1* | 8/2016 | Ha | G06Q 30/0242 |
| 2017/0083088 A1* | 3/2017 | Lannsjo | G06F 3/013 |
| 2018/0239440 A1* | 8/2018 | Noda | G06F 3/038 |

* cited by examiner

SYSTEMS AND METHODS TO ENABLE AND DISABLE SCROLLING USING CAMERA INPUT

BACKGROUND

As recognized herein, scrolling of content presented on a display may be performed by a device based on input from a camera. For example, eye movements and head tilts as detected using the camera may be used for the device to determine that it should scroll text as a user reads through the text so that the user does not need to provide touch input to the display to scroll but is still able to continue reading the text. This may be desirable if the user is, for instance, reading instructions for cooking or working on an automobile and the user's hands are dirty, and hence the user might not wish to touch the device with dirty hands. However, as also recognized herein, there are instances where this type of scrolling may also be annoying, such as when the user is holding the device in his/her hand and simply wishes to scroll manually by directing input to the device's display. There are currently no adequate solutions to the foregoing computer-related, technological problem.

SUMMARY

Accordingly, in one aspect a device includes at least one processor, a camera accessible to the at least one processor, at least one sensor accessible to the at least one processor, a display accessible to the at least one processor, and storage accessible to the at least one processor. The storage bears instructions executable by the at least one processor to receive input from the at least one sensor and determine, based on the input, whether a user is making physical contact with the device. Based on a determination that the user is not making physical contact with the device, the instructions are executable by the at least one processor to execute scrolling of content based on input from the camera, with the content presented on the display. Based on a determination that the user is making physical contact with the device, the instructions are executable by the at least one processor to decline to execute scrolling of content based on input from the camera.

In another aspect, a method includes determining whether a user is touching a device with at least a portion of the user's body and enabling, responsive to determining that the user is not touching the device with at least a portion of the user's body, scrolling of content using input from a camera on the device. The method also includes disabling, responsive to determining that the user is touching the device with at least a portion of the user's body, scrolling of content using input from a camera on the device.

In still another aspect, a computer readable storage medium that is not a transitory signal includes instructions executable by at least one processor on a device to receive input from at least one sensor on the device and determine, based on the input, whether a user is touching the device. The instructions are also executable by the at least one processor to execute scrolling of content using from a camera based on a determination that the user is not touching the device, and to disable scrolling of content using input from the camera based on a determination that the user is touching the device.

The details of present principles, both as to their structure and operation, can best be understood in reference to the accompanying drawings, in which like reference numerals refer to like parts, and in which:

DETAILED DESCRIPTION

Figure 1:
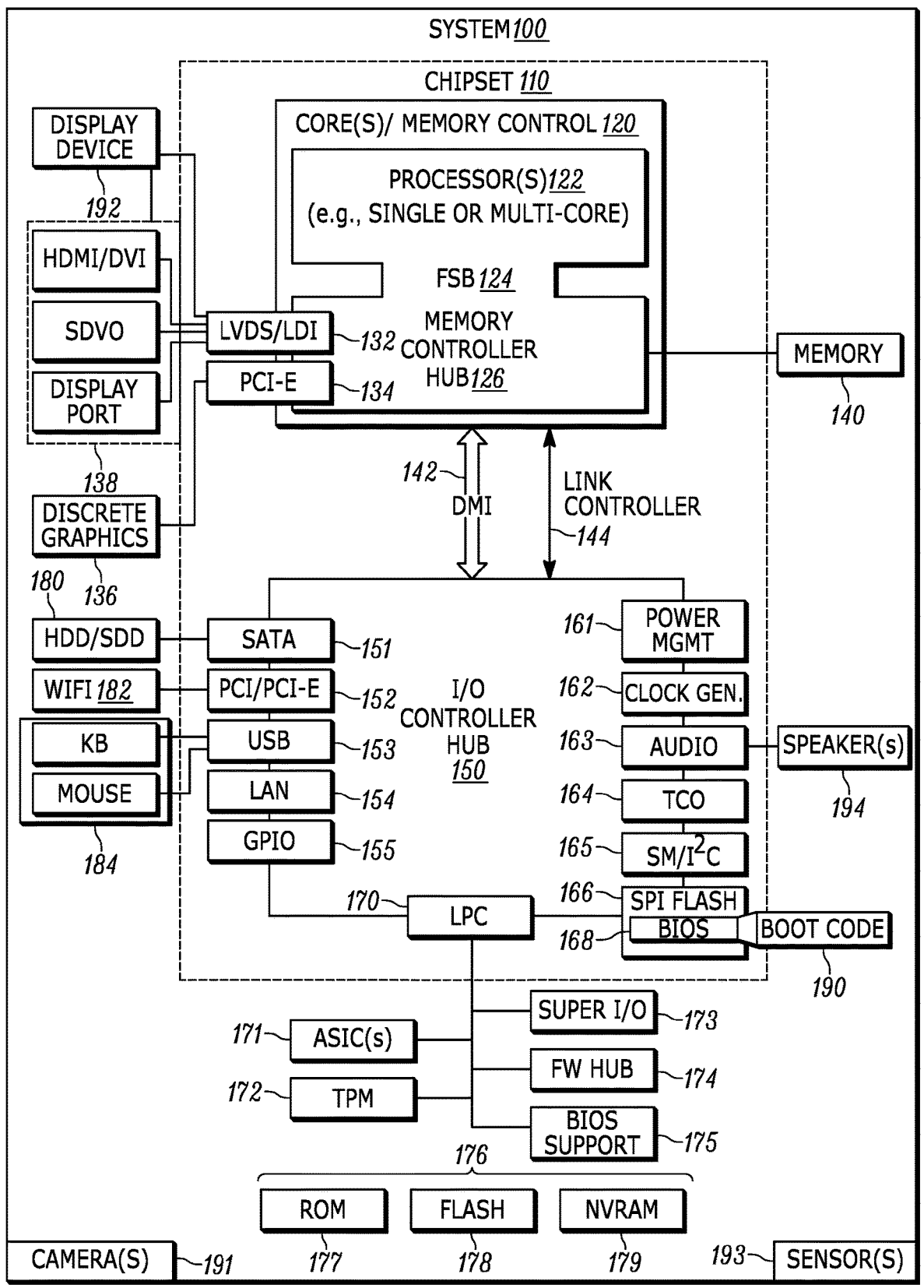
FIG. 1 is a block diagram of an example system in accordance with present principles.

Disclosed herein are systems and methods to identify whether a device is being held (using sensors like a touch sensor, proximity sensor, accelerometer, and/or camera) and enabling a head/eye scroll feature when the user's hands are not touching or near the device's display. Thus, if the device is put down (e.g., with the display on) or if the aforementioned detection is otherwise triggered, then the head/eye scroll feature may be enabled. The feature may be disabled when the user picks the device back up (e.g., once the device waits for a small timeout period after pickup).

Additionally, if the user manually triggers the feature while holding the device, the circumstances/contexts surrounding the manual triggering may be logged and a rule can be learned by the device to automatically trigger the feature in the future after the user manually does so a threshold number of times. Rules may also be learned for when to automatically disable the feature based on a threshold number of manual disablements.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash)

166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more cameras 191 for gathering images of a user and providing the images and/or related data as input to the processor(s) 122. The camera(s) 191 may be a thermal imaging camera, a digital camera such as a webcam, a three-dimensional (3D) camera, and/or a camera otherwise integrated into the system 100 and controllable by the processor 122 to gather pictures/images and/or video.

One or more additional sensors 193 may also be included on the system 100. The sensor(s) 193 may include touch sensors such as a capacitive touch sensor or touch display, a conductive touch sensor or touch display, and a resistive touch sensor or touch display. The sensors 193 may also include proximity sensors such as a sonar proximity sensor, an ultrasonic proximity sensor, a radar proximity sensor, an infrared (IR) proximity sensor, a heat sensor, a laser rangefinder, and/or an optical proximity sensor.

Additionally or alternatively, the sensors 193 may include motion sensors such as an accelerometer, gyroscope, and/or GPS transceiver. The accelerometer may sense acceleration and/or movement of the system 100 and provide input related thereto to the processor 122, while the gyroscope may sense and/or measure the orientation of the system 100 and provide input related thereto to the processor 122. The GPS transceiver may be configured to receive geographic position information from at least one satellite and provide the information to the processor 122 to identify movement of the system 100 as it changes geographic positions. However, it is to be understood that another suitable position receiver other than a GPS receiver may be used in accordance with present principles to detect motion of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
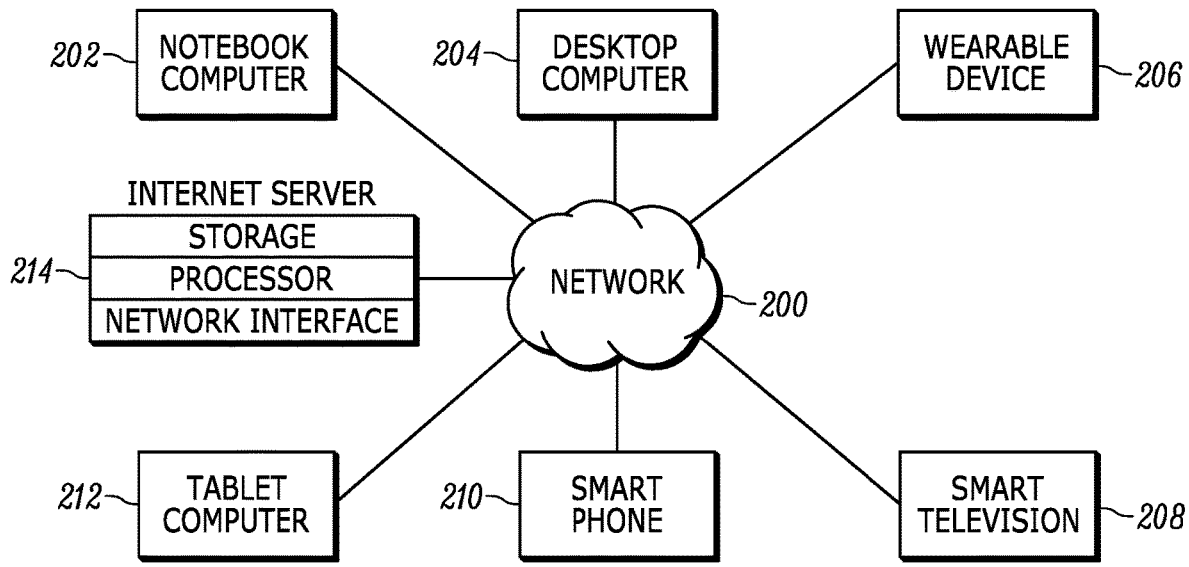
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
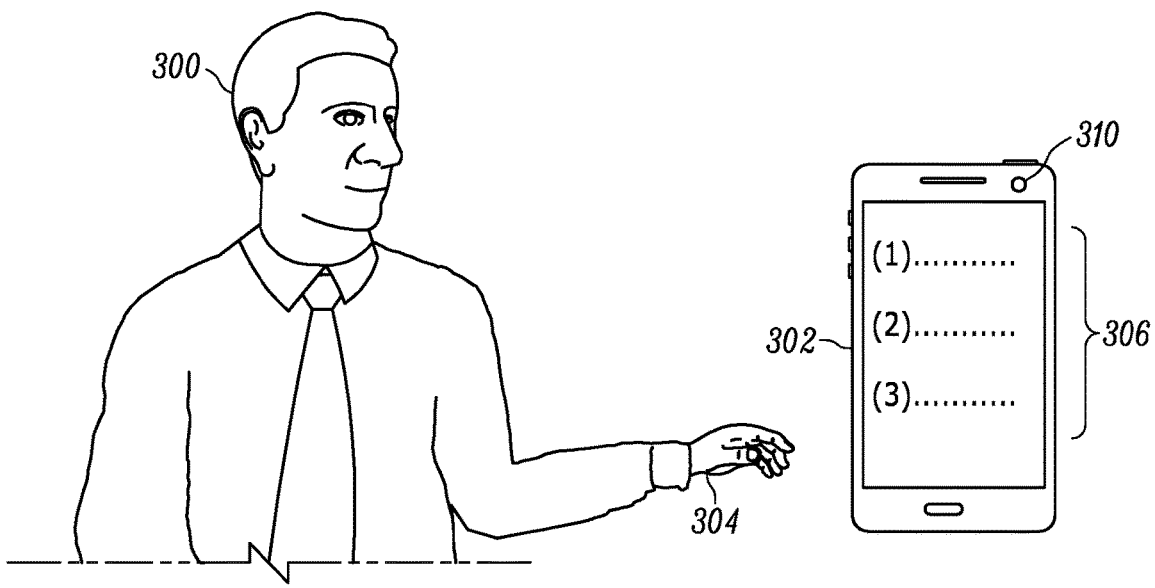
FIGS. 3-5 are example illustrations in accordance with present principles.

Now in reference to FIG. 3, it shows a user 300 holding his/her smart phone 302 with the user's hand 304. A first portion 306 of content is presented on the display of the smart phone 302 as shown. Because the user 300 is touching the phone by holding the phone in the user's hand 304, the user may scroll from the first portion 306 of the content to a second portion of the content by directing input to the display of the smart phone 302, such as by scrolling up or down by respectively sliding/swiping the user's thumb up or down on the display of the smart phone 302. However, because the smart phone 302 determines that the user is touching/physically contacting the smart phone 302, the smart phone 302 disables scrolling using input from a camera 310.

Figure 4:
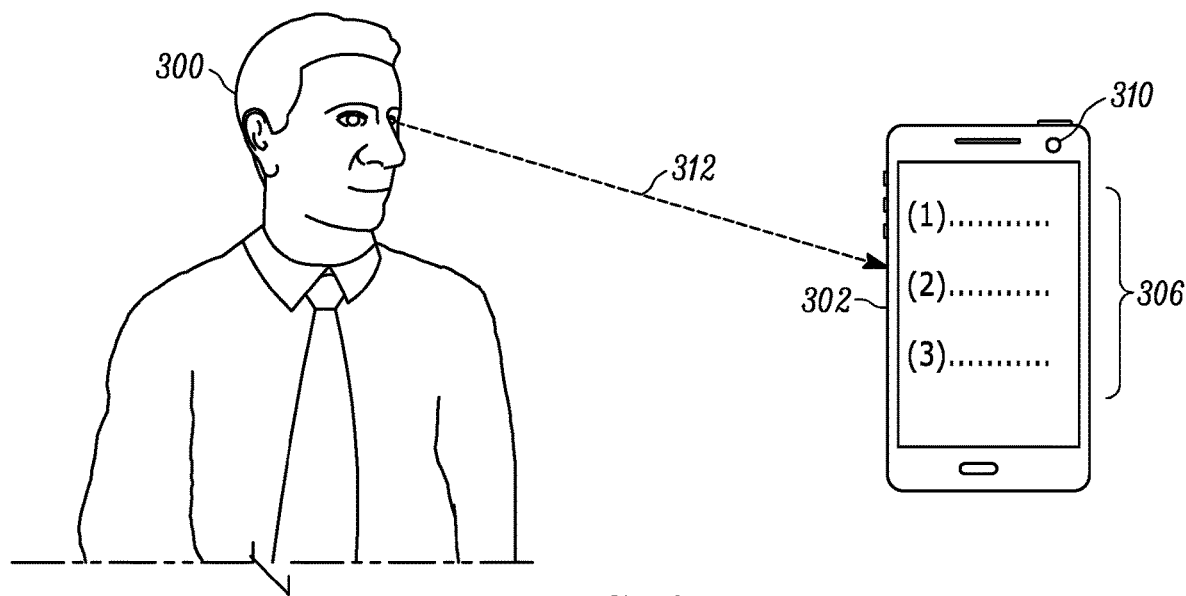

FIG. 4 shows that the user 300 is no longer holding the smart phone 302. The same first portion 306 is still presented on the display of the smart phone 302 as the user 300 reads the first portion 306. The user's line of sight 312 may be tracked by the smart phone 302 using input from the camera 310 as it images the user's eyes, and also using eye tracking software to track eye movement based on the input from the camera 310.

Figure 5:
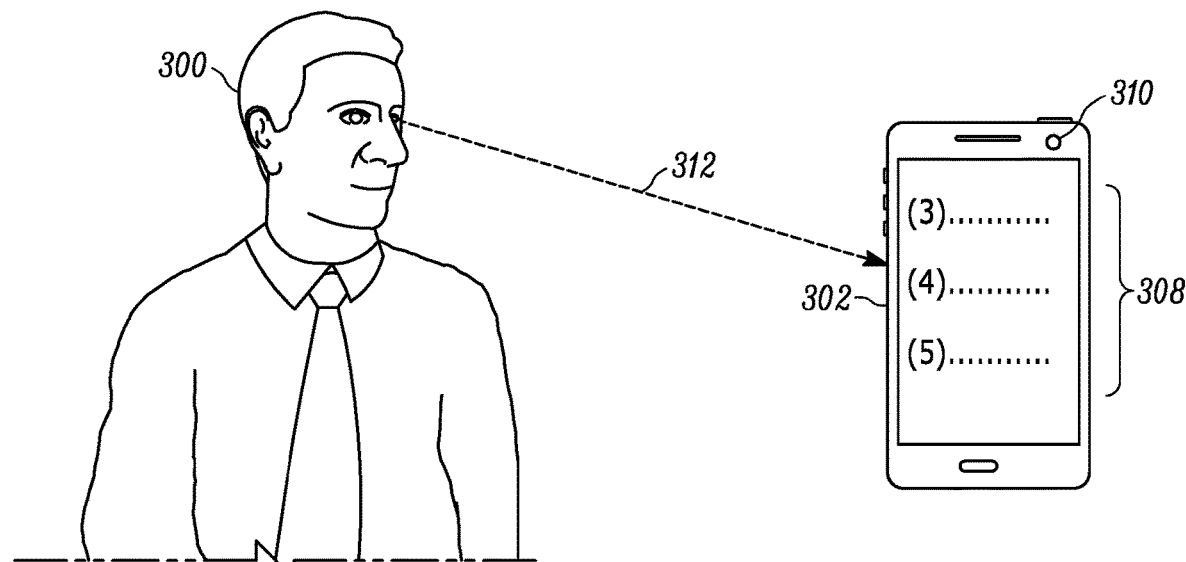

FIG. 5 shows that as the user's line of sight 312 moves down the display as the user 300 reads the first portion 306 while still not touching the smart phone 302, the smart phone 302 may recognize that the user's line of sight 312 has changed as the user 300 continues to read down through the content. Accordingly, a second portion 308 of the content may be automatically scrolled to by the smart phone 302 without additional user input to scroll other then the eye movement itself of the user 300. In some examples, the second portion 308 may be scrolled to once the user's line of sight reaches a threshold point on the content or display. Note that the second portion 308 may include some of the first portion 306 (such as bullet point number three as shown) and additional portions of the content not included in the first portion 306 and hence not previously presented on the display as was shown in FIG. 4 (such as bullet point numbers four and five as shown in FIG. 5).

Before moving on in the detailed description, it is to be understood in accordance with present principles that in addition to or in lieu of using eye tracking, head movement tracking may be used. For example, the smart phone 302 may track a user's head movements using input from the camera 310 and gesture recognition software to determine that the user 300 progressively tilts his/her head downward as the user reads through the content from top to bottom. Once the user reaches a threshold point on the display or content as he/she reads, the smart phone 302 may scroll to additional content.

Figure 6:
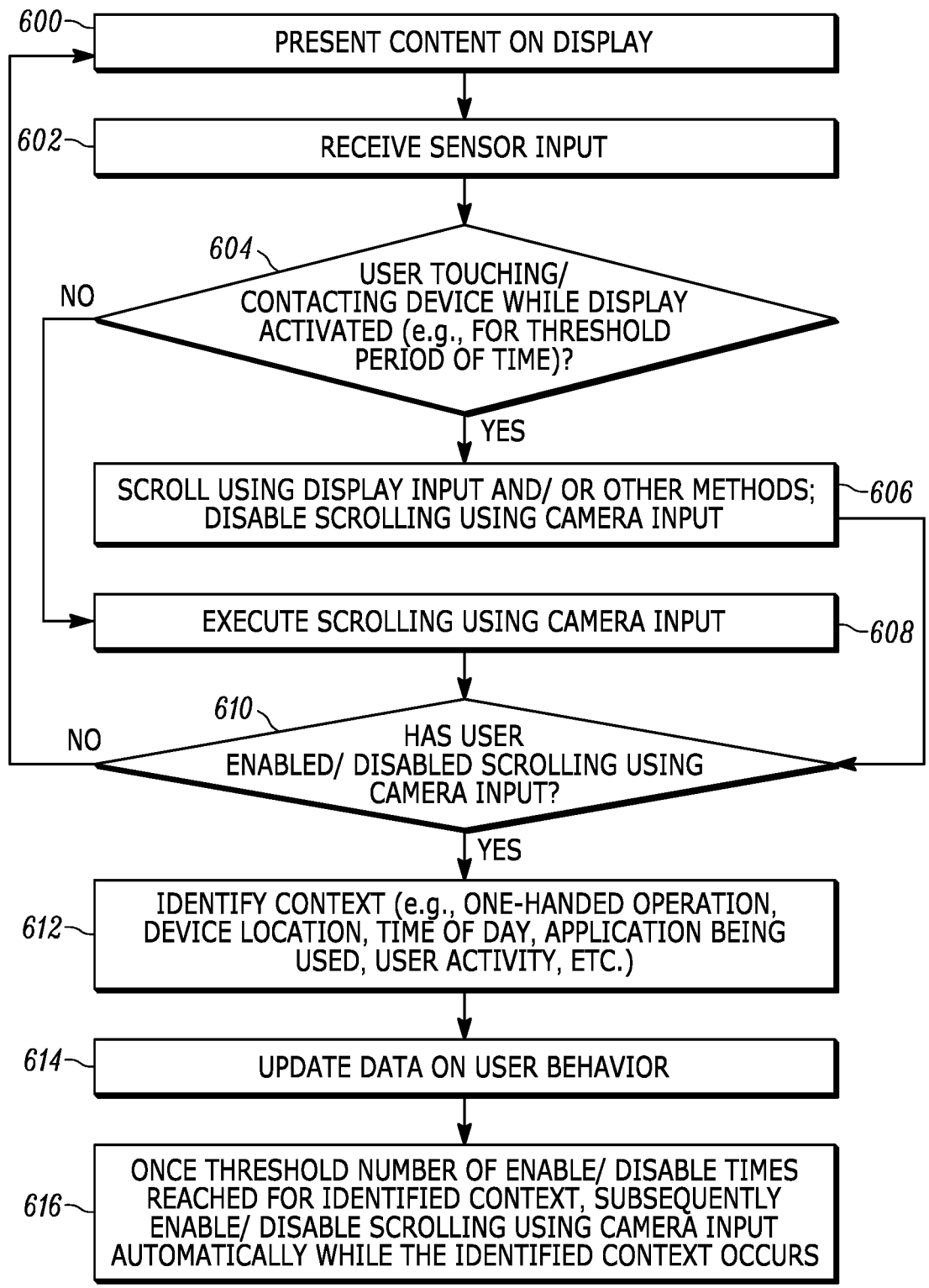
FIGS. 6 and 7 are flow charts of example algorithms in accordance with present principles.

Referring to FIG. 6, it shows example logic that may be executed by a device such as the system 100 and/or smart phone 302 in accordance with present principles. Beginning at block 600, the device may present content on a display that is on or otherwise accessible to the device. The content may be, for example, a news article, word processing document, web page, etc. From block 600 the logic may move to block 602. At block 602 the device may receive input from one or more sensors on the device, such from a touch sensor, proximity sensor, or another one of the sensors discussed above in reference to the sensor(s) 193 of FIG. 1.

From block 602 the logic may then proceed to decision diamond 604. At diamond 604 the device may determine whether, based on the input received at block 602, the user is touching or otherwise physically contacting the device with a portion of his/her body. Moreover, in some examples diamond 604 may include a determination regarding whether the user is touching the device for at least a threshold time and/or whether the display is currently activated while the user is touching the device (e.g., currently presenting output such as the content itself).

As an example, an affirmative determination may be made at diamond 604 based on a change in capacitance as indicated in input from a capacitive touch sensor on the device to thus infer touch contact of the user with the device. As another example, input from an accelerometer on the device that indicates movement of the device may be identified as indicative of touch contact of the user with the device. As yet another example, input from the device's camera may show the user's hand as touching another portion of the device visible to the camera and hence the device may determine that the user is touching the device. As still another example, input from the device's touch-enabled display (that is presenting the content itself) that indicates touch input to the touch-enabled display may be used by the device to determine that the user is touching the device owing to the user touching the touch-enabled display. Additionally, input from a GPS transceiver indicating a change in GPS coordinates for the device may be determined by the device as being indicative of the user touching the device.

A negative determination at diamond 604 may cause the logic to proceed to block 608, which will be described shortly. However, first note that an affirmative determination at diamond 604 may instead cause the logic to proceed to block 606. At block 606 the logic may execute scrolling responsive user input to the device's display to scroll through the content and/or responsive to a voice command to scroll through the content. However, scrolling using input from the device's camera may be disabled at block 606 so that scrolling is not executed using camera input regardless of a line of sight of the user or the user's head tilt as the user reads through the content. From diamond 604 the logic may then proceed to decision diamond 610, which will be described shortly.

However, referring back to diamond 604, note that a negative determination thereat may instead cause the logic to proceed to block 608. At block 608 the logic may execute scrolling based on input from the device's camera at an appropriate time, such as when the user's line of sight reaches a predetermined portion of the device's display or when the user tilts his/her head a predetermined amount. Eye scrolling software and head tilt/gesture scrolling software may be used to analyze images from the camera to determine as much.

From block 608 the logic may then proceed to decision diamond 610. At diamond 610 the device may determine whether the user has enabled or disabled scrolling using camera input, such as the user might do by providing a voice command to the device for the device to enable or disable scrolling using camera input, or by providing touch input to a selector presented on the device's display for enabling or disabling scrolling using camera input. Selector 804 of FIG. 8 and option 902 of FIG. 9 are both examples of selectors that may be selected for enabling or disabling scrolling using camera input. Both of those items will be discussed further below. However, still in reference to diamond 610 of FIG. 6, note that should a negative determination be made the logic may revert back to block 600 and proceed therefrom while an affirmative determination may cause the logic to proceed to block 612.

At block 612 the device may identify a context that is currently occurring. Examples of contexts that might be occurring are one-handed operation of the device (as identified based on input from the one or more sensors on the device), a current location of the device (as identified based on network connectivity information or GPS coordinates from the device's GPS transceiver), and a current time of day/time range (as identified from a clock application executing at the device). Another example of a context may be an application that is currently being presented on the display in the foreground as determined by the device's processor, an application that is currently launched and being executed by the device as determined by the device's processor, an application that is otherwise being currently interacted with by the user as determined by the device's processor, and/or an application that is otherwise currently presenting data on the device's display as determined by the device's processor.

As yet another example of context, an activity being engaged in by the user may establish the context. The activity may or may not directly relate to interaction with the device itself. For example, input from the device's camera may be used to determine that a user is cooking or performing work on his/her car (e.g., using gesture recognition and/or communication with a remotely-located server for identifying as much), and that the user is interacting with the device to follow cooking or car repair instructions, respectively.

From block 612 the logic of FIG. 6 may then proceed to block 614. At block 614 the device may update a database pertaining to user behavior responsive to the user enabling or disabling scrolling using camera input during the identified context. The database may be updated to include data indicating whether the user enabled or disable the feature, and indicating the context that was identified as occurring when the user enabled or disabled the feature. The logic may then proceed from block 614 to block 616.

At block 616 the logic may, responsive to determining that scrolling using camera input has been enabled or disabled a threshold number of times during an identified context (as may be identified by accessing the aforementioned database), subsequently enable or disable scrolling using camera input automatically when the context is again identified as occurring. The threshold number of times may be a whole number greater than one in some examples.

Thus, for example, should a user provide input a threshold number of times to disable scrolling using camera input while operating the device with one hand, the device may automatically disable such scrolling any other time thereafter that it determines the user is operating the device with one hand. As another example, should a user provide input a threshold number of times to enable such scrolling during A.M. hours of the day despite touching the device, the device may automatically enable camera-based scrolling thereafter any other time it determines that a current time of day is in the A.M. hours and the user is touching the device, even if camera-based scrolling is disabled during P.M. hours of the day while the user touches the device.

Figure 7:
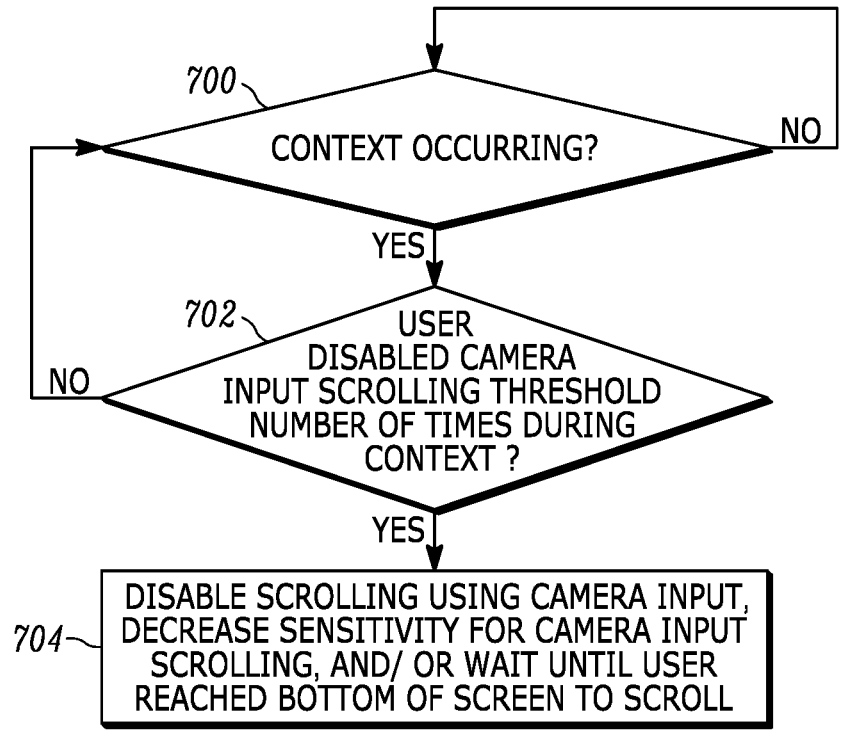

Now referring to FIG. 7, it shows example logic that may be executed by the device separately from or in conjunction with the logic of FIG. 6. Beginning at decision diamond 700, the device may determine whether a particular context is occurring. A negative determination at diamond 700 may cause the device to continue making the determination at diamond 700 until an affirmative one is made. Then, once an affirmative determination is made at diamond 700 the logic may proceed to decision diamond 702. At diamond 702 the logic may determine whether the user has previously disabled scrolling using camera input a threshold number of times in the past while the same context occurred. The device may do so based on data stored in the database referenced above that indicates past numbers of instances the user performed disabling in various respective contexts.

A negative determination at diamond 702 may cause the logic to revert back to diamond 700 and proceed therefrom. However, an affirmative determination at diamond 702 may instead cause the logic to proceed to block 704. At block 704 the device may, responsive to the affirmative determination at diamond 702, disable scrolling of content using camera input, or the device may decrease the trigger or sensitivity for scrolling using camera input. Additionally or alternatively, responsive to the affirmative determination at diamond 702 the device may wait until the user has reached a relatively lower portion of the content or display with his/her line of sight before automatically scrolling than would otherwise be used for triggering scrolling.

Providing an example regarding decreasing the trigger/sensitivity as mentioned above, the device may determine that the user has reached an end of content that is presented on the device's display. Once this occurs, rather than immediately and automatically scrolling to another portion of content as it otherwise would, the device may instead wait for the user's gaze to remain at the end of the content for a threshold non-zero time before automatically scrolling based on camera input.

Providing an example regarding waiting until the user reaches a lower point on the display with his/her line of sight as mentioned above, the device may wait until the user's line of sight reaches a point three-quarters of the way down the display before scrolling, as opposed to waiting until the user's line of sight reaches a relatively higher point on the display such as five eighths of the way down the display.

Still in reference to FIG. 7, it is to be understood that in some examples an affirmative determination at diamond 700 may cause the device to proceed to block 704 without first executing the determination of diamond 702. For instance, any time the device determines that the user is using one hand and not two hands to operate/hold the device, the device may simply decrease the aforementioned sensitivity or wait until the user has reached a lower portion of the content with his/her line of sight before scrolling than would otherwise be used.

Figure 8:
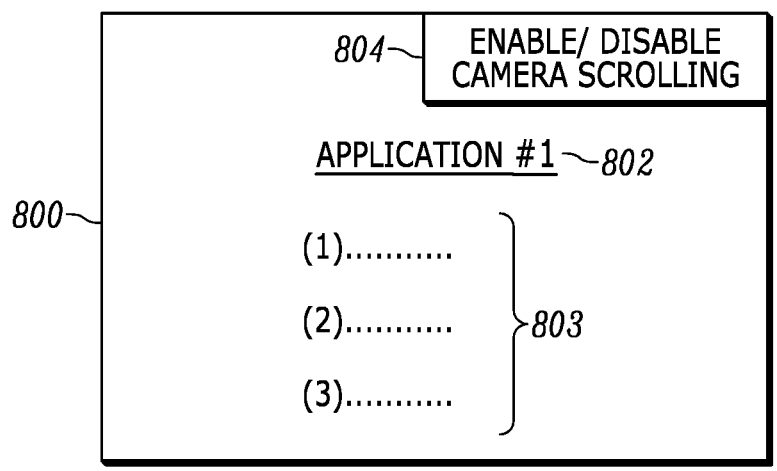
FIGS. 8 and 9 are example user interfaces (UIs) in accordance with present principles.
Figure 9:
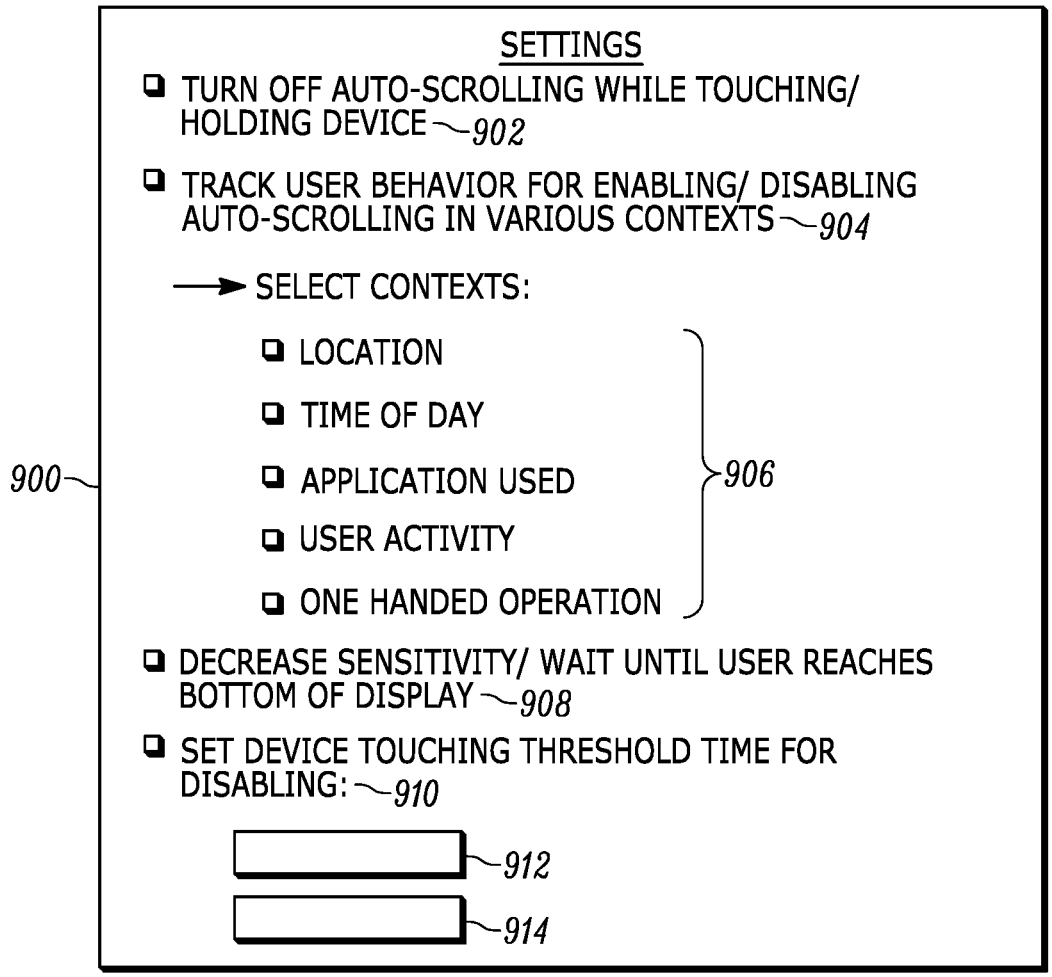

Continuing the detailed description in reference to FIG. 8, it shows an example user interface (UI) 800 that may be presented on the display of a device undertaking present principles. The UI 800 may present a specific application 802 and associated content 803. Concurrently with presenting the application and content 802, 803, the UI 800 may also present a selector 804. The selector 804 may be selectable to enable scrolling using camera input, should the device have been previously set to have its scrolling using camera input disabled. Conversely, should the device have been previously set to have its scrolling using camera input enabled, selection of the selector 804 may instead disable it.

Now in reference to FIG. 9, a settings UI 900 is shown that may be presented on the display of a device undertaking present principles. It is to be understood that each setting/option and sub-option to be discussed below may be selected by directing input to the respective check box shown adjacent to the respective option or sub-option (e.g., touch input or cursor input).

Beginning first with option 902, it may be selected to turn off automatic scrolling using camera input so that the automatic scrolling will not be performed if the device determines that the user is touching or otherwise physically contacting the device. Thus, in some embodiments selection of option 902 may configure the device to execute the logic of FIG. 6, whereas if option 902 is deselected or remains unselected the device may automatically scroll using camera input regardless of whether the user is touching the device.

An option 904 may also be presented on the UI 900. The option 904 may be selected to specifically configure the device to track user behavior for enabling/disabling scrolling using camera input based on various contexts that the device might identify. Thus, in some embodiments selection of option 904 may configure the device specifically to execute steps 610-616 of FIG. 6 and/or to execute the logic of FIG. 7. Furthermore, in some embodiments sub-options 906 may be presented that are respectively selectable by a user to specify certain contexts to use while not using others (by leaving the other options unselected). The example context sub-options 906 shown in FIG. 9 include device/user location, current time of day, application being used, activity engaged in by the user, and one-handed operation of the device.

FIG. 9 also shows that the UI 900 may include an option 908 that is selectable to configure the device to decrease the sensitivity of scrolling using camera input and/or to enable the device to wait until a user's line of sight reaches a relatively lower portion of the display to trigger automatic scrolling based on camera input, as disclosed herein.

Still further, the UI 900 may include a setting 910 for the user to configure a threshold time the device is to wait from the beginning of a device touch before disabling scrolling based on camera input. Thus, a number may be input to box 912 and a time increment to associate with the number may be input to box 914. For example, if a user enters two into box 912 and seconds into box 914, the device may be configured to wait two seconds before disabling scrolling based on camera input.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory, propagating signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a camera accessible to the at least one processor;
   at least one sensor accessible to the at least one processor;
   a display accessible to the at least one processor; and
   storage accessible to the at least one processor and bearing instructions executable by the at least one processor to:
   receive input from the at least one sensor, the input indicating physical contact by a user with the device;
   determine, based on the input, whether the user is using more than one hand to touch the device;
   based on a determination that the user is using plural hands to touch the device execute scrolling of content based on input from the camera according to a first sensitivity level; and
   based on a determination that the user is using one hand to touch the device, execute scrolling of content based on input from the camera according to a second sensitivity level that is different from the first sensitivity level.

2. The device of claim 1, wherein the at least one sensor comprises the display, and wherein physical contact is sensed based on input from the display.

3. The device of claim 1, wherein the instructions are executable by the at least one processor to:
   based on a determination that the user is not making physical contact with the device and based on a determination that the display is activated, execute scrolling of content based on input from the camera.

4. The device of claim 1, wherein the instructions are executable by the last least one processor to:
   identify at least one context;
   determine that, while the context occurs and while the user is making physical contact with the device, the user enables scrolling of content based on input from the camera; and
   responsive to a determination of the user enabling scrolling of content based on input from the camera a predetermined threshold number of times greater than one while the context occurs and while the user is making physical contact with the device, subsequently enabling scrolling of content based on input from the camera during the context without additional user input to enable scrolling of content based on input from the camera.

5. The device of claim 4, wherein the context is one-handed operation of the device.

6. The device of claim 4, wherein the context is a current location of the device.

7. The device of claim 4, wherein the context is a current time of day.

8. The device of claim 4, herein the context is an application that is currently presenting data on the display.

9. The device of claim 4, wherein the context is an activity currently engaged in by the user.

10. The device of claim 1, wherein the instructions are executable by the last least one processor to:
    identify at least one context;
    determine that, while the context occurs, the user disables scrolling of content based on input from the camera; and
    responsive to a determination of the user disabling scrolling of content based on input from the camera a predetermined threshold number of times greater than one while the context occurs, subsequently disabling scrolling of content based on input from the camera during the context without additional user input to disable scrolling of content based on input from the camera.

11. The device of claim 1, wherein the second sensitivity level is less than the first sensitivity level.

12. A method, comprising:
    receiving input from at least one sensor on a device, the input indicating physical contact by a user with the device;
    determining, based on the input, whether the user is using more than one hand to touch the device;
    based on determining that the user is using plural hands to touch the device, executing scrolling of content based on input from a camera according to a first sensitivity level; and
    based on determining that the user is using one hand to touch the device, execrating scrolling of content based on input from the camera according to a second sensitivity level that is different from the first sensitivity level.

13. The method of claim 12, wherein the second sensitivity level is less than the first sensitivity level.

14. The method of claim 12, comprising:
    identifying that the user has provided first input enabling scrolling of content based on input from the camera;
    identifying a context that exists while the user provides the first input enabling scrolling of content based on input from the camera, the context comprising one or more of: a current location of a device, a current time of day, and/or an application that is currently presenting data on a display accessible to the device;
    based on the first input, enabling scrolling of content based on input from the camera; and
    during a future occurrence of the context, and based on identification of the user previously providing inputs enabling scrolling of content based on input from the camera a predetermined threshold number of times greater than one while the context occurs, automatically enabling scrolling of content based on input from the camera, without additional user input to do so.

15. The method of claim 14, wherein the context comprises a current location of the device and/or a current time of day.

16. The method of claim 14, wherein the context comprises an application that is currently presenting data on a display accessible to the device.

17. A computer readable storage medium (CRSM) that is not a transitory signal, the computer readable storage medium comprising instructions executable by at least one processor on a device to:
    receive input from at least one sensor on the device;
    determine, based on the input, whether a user is using one or two hands to touch the device;

based on a determination that the user is using two hands to touch the device, execute scrolling of content based on input from a camera according to a first sensitivity level; and based on a determination that the user is using one hand to touch the device, execute scrolling of content based on input from the camera according to a second sensitivity level that is less than the first sensitivity level.

18. The CRSM of claim 17, wherein according to the second sensitivity level the device waits, prior to scrolling, a threshold non-zero amount of time while a user looks at a particular display location, the threshold non-zero amount of time being greater than the device would wait to scroll according to the first sensitivity level upon the user looking at the particular display location.

19. The CRSM of claim 17, wherein according to the second sensitivity level the device waits, prior to scrolling, until a user's gaze reaches a lower point on a display of the device than for scrolling according to the first sensitivity level.

20. The CRSM of claim 17, wherein the instructions are executable by the at least one processor to:

present a graphical user interface (GUI) on a display accessible to the at least one processor, the GUI comprising an option that is selectable to enable the at least one processor to use varying sensitivity levels for scrolling rather than one sensitivity level, the varying sensitivity levels comprising at least the first and second sensitivity levels.

\* \* \* \* \*